July 7, 1959 F. S. SILLARS ET AL 2,893,026
METHODS OF BONDING BY THERMOPLASTIC ADHESIVES
Filed June 1, 1953 4 Sheets-Sheet 3

Inventors
Frederick S. Sillars
Henry C. Pavian, Dec'd
Dorathy S. Pavian Admx.
By their Attorney July 7, 1959  F. S. SILLARS ET AL  2,893,026
METHODS OF BONDING BY THERMOPLASTIC ADHESIVES
Filed June 1, 1953  4 Sheets-Sheet 4
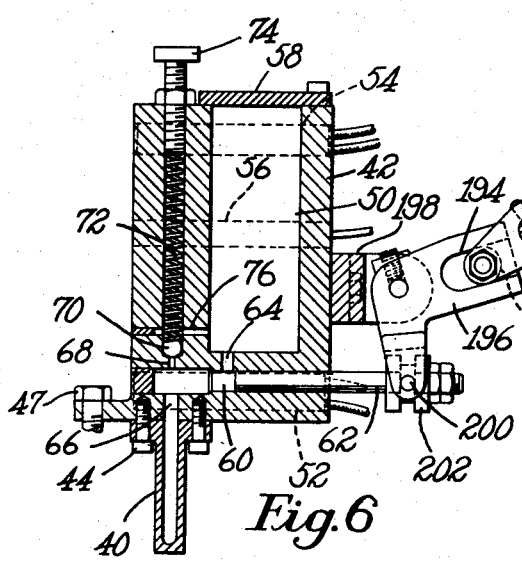
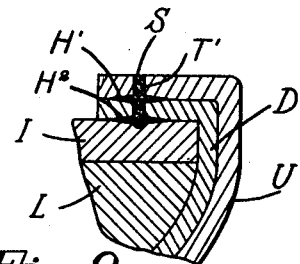
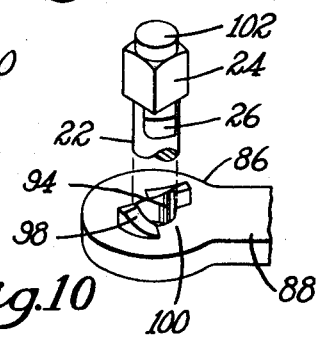
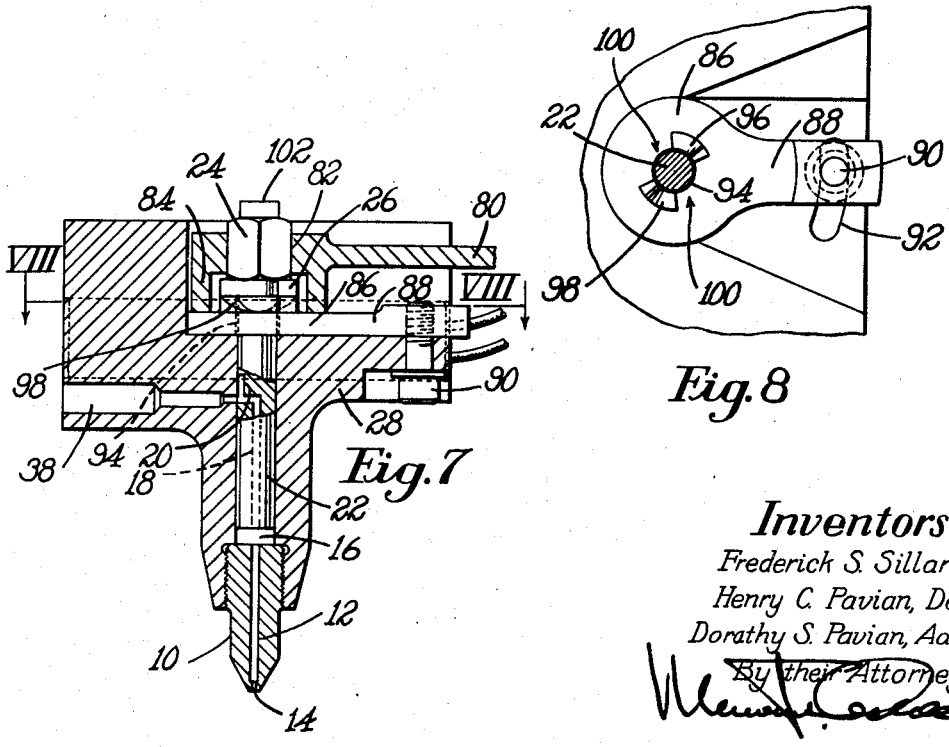
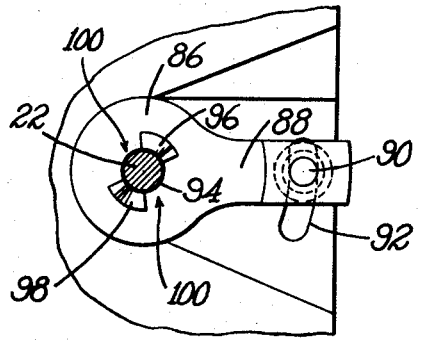
Inventors
Frederick S. Sillars
Henry C. Pavian, Dec'd
Dorathy S. Pavian, Admx.
By their Attorney United States Patent Office 2,893,026
Patented July 7, 1959

2,893,026

METHODS OF BONDING BY THERMOPLASTIC ADHESIVES

Frederick S. Sillars, Beverly, and Henry C. Pavian, late of Beverly, Mass.; Dorathy S. Pavian, administratrix of Henry C. Pavian, deceased, assignors to United Shoe Machinery Corporation, Boston, Mass., a corporation of New Jersey Application June 1, 1953, Serial No. 359,982

2 Claims. (Cl. 12—142)

(Filed under Rule 47(a) and 35 U.S.C. 116)

This invention relates to methods of bonding by thermoplastic adhesives which are introduced to the interface between preassembled parts by passing the adhesive through the unbroken surface of one of these parts.

It is well understood that it is possible to obtain an especially good bond between pieces of work by the use of "hot-melt" or thermoplastic adhesives which are heated and applied in a molten condition. Many difficulties have appeared, however, in the use of such adhesives. One such difficulty lies in the deterioration of some materials, depending upon their composition, when subjected to heat over a considerable period. A number of instances have occurred where it was necessary to clean out the old adhesive from the heated receptacle and the charred and hardened material has been exceptionally difficult to remove. Another difficulty which arises results from the fact that the pieces of work have a substantially lower temperature than that of the adhesive being applied, with the consequent chilling of the adhesive before it is possible to bring the work pieces together to make a bond. Other attempts have involved a procedure requiring the reactivation of the adhesive previously applied to the pieces of work but it is undesirable to heat the work itself because of the danger of damage thereto and in most cases it is very difficult to introduce a heated activating member directly into contact with the adhesive in a preassembled joint.

It has been found, however, that it is possible forcibly to introduce the adhesive directly to the interface between the layers of a joint by passing the adhesive through one of the layers. Previous attempts to bring this about have always required the utilization of preformed apertures into which the adhesive was introduced. This has disadvantages both because of the expense of preparing a series of apertures and because of the resultant disfiguration of the exposed surface of the work.

It has been found, however, that it is possible to introduce the adhesive through the unbroken, exposed surface of one of the preassembled pieces of work without a resultant disfiguration of the work and, in accordance with a principal object of the invention, an improved method of bonding superimposed pieces of material has been provided. In accordance with this method, an adhesive is instantaneously introduced to the interface between said layers by applying the adhesive in the form of a high pressure jet having a considerable velocity to an unbroken or solid, outer surface of the material constituting one layer thereby causing it to penetrate one of the pieces which are held superposed in contact with each other in order to cause the adhesive to reach and spread out upon the interface between said pieces. It will be understood that the degree of dispersion of the adhesive within a layer and at the interface depends upon various factors including the velocity of the jet, the viscosity of the adhesive, the size of the jet and perhaps the relative density of the underlying layer with respect to the punctured layer. Frequently, the method will find its application to bonds involving outer layers which are open structured, fibrous, or porous as is leather or soft wood compared to a homogeneous material such as a metal. With these relatively open structured materials, especially, there may be a branching of the main stem of the injected adhesive.

From another aspect, the present method resides in the attachment of insoles to lasts by holding them together and injecting molten adhesive through the outer surface of the insole to disperse at the interface between the insole and the last and quickly freeze upon contact with the last. Further, adhesive bonds can be located close to the periphery of an insole without interference with the stitches, staples, etc. used to hold an overlasted upper in position.

As noted above, the variety of materials to be treated, differing as they do in porosity or compactness, density and the like, makes it desirable to utilize adhesive of varying compositions and characteristics. For the sake of illustration and without limiting the scope of the invention it is to be noted that many of these hot-melt adhesives are resinous materials. Among these are the polyamides many of which have been found useful in applying the jet to the unbroken surface of comparatively light, fibrous materials. For such a use, a range of nozzle openings from 12 thousandths to 40 thousandths of an inch is convenient and the molten cement may readily be caused to emerge from these orifices at a speed of 800 to 2000 or more feet per second.

A machine for carrying out that part of the method which involves the delivery of a jet at very high velocity, as illustrated herein, comprises a nozzle having one or more minute openings, a nozzle holder having an adhesive receiving chamber, a nozzle piston slidably fitting that chamber, and a hammer for striking a sharp blow against the piston to accelerate it and cause the emergence of adhesive in the form of a high velocity jet of very small diameter. This machine is covered in an application of Frederick S. Sillars, Serial No. 358,809, filed June 1, 1953, now Patent No. 2,778,530, granted January 22, 1957.

These and other features of the invention will best be understood by consideration of the following specification, taken in connection with the accompanying drawings in which Fig. 1 is a side elevation, with parts broken away and in section, of the head of the machine;

Fig. 6 is a vertical section on line VI—VI of Fig. 2;

Fig. 7 is a vertical section on an enlarged scale through the nozzle taken on the same plane as Fig. 3;

Fig. 8 is a horizontal section on the line VIII—VIII of Fig. 7 looking down on a cam-adjusting lever;

Fig. 9 is a section greatly enlarged, through cement applied to an upper overlasted upon an insole; and Fig. 10 is an angular view of the cam-adjusting lever.

Figure 4:
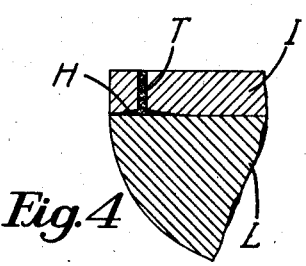
Fig. 4 is a vertical section on a greatly enlarged scale through an insole on a last and showing the cement which has been applied at one spot in accordance with the invention.
Figure 5:
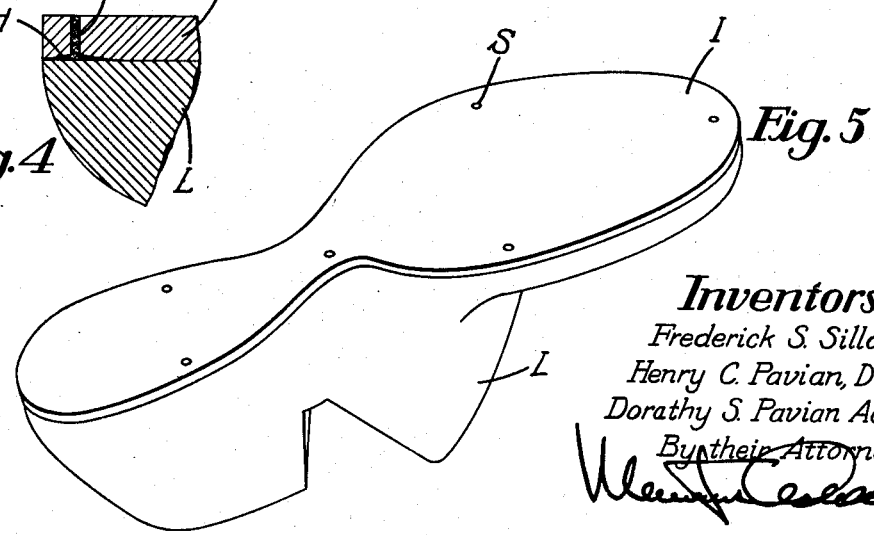
Fig. 5 is an angular view of an insole attached to a last by this method.

A large number of instances will readily occur to the reader where the method may be profitably employed in doing work of various types. One of these is illustrated in Figs. 4 and 5 where the method is employed for attaching an insole to a last to hold it in its proper location thereon temporarily during the assembly of a shoe upper upon the last, the pulling over and the lasting operations. This has commonly been done by means of driven fastenings such as tacks, but when such fastenings have been employed the lasts became worn so that the tacks did not hold and the subsequent removal of the tacks prior to the bottoming of the shoe has constituted an extra operation. This has been an added expense in itself and has involved numerous difficulties such as the disposal of the used tacks, possible damage to the insole during the removal of the tacks, and the occasional leaving of a tack in the shoe to the disgust of the wearer and damage the reputation of the maker.

It will be understood that an insole I in the form of a flat sheet is positioned manually upon a last L and bent to correspond to the curvature of the last bottom and in this condition is presented to a nozzle for the delivery of a jet of adhesive at high velocity. The insole is then secured to the last at a number of spots S varying from three to six or more according to what is necessary in order to keep the insole conformed to both the longitudinal and the transverse curvatures of the bottom of the last by changing the relation of nozzle and insole transversely of the latter and along the outer surface thereof. Happily, the same general system as has been customary, when using tacks, may be employed when the securing means is a hot-melt adhesive which is driven at high velocity through the unbroken outer surface of the insole and, having passed through the whole thickness thereof, is dispersed on the interface between the insole and the last. There the material almost instantaneously "chills" or "freezes" forming a bond of entirely adequate strength to hold the insole in place during the shoemaking operations which follow. It is found that the subsequent removal of the last from the substantially completed shoe offers no difficulties and no undue or added effort is required to move it in a direction making a sharp or low angle with the bottom of the last. Perhaps this is due to the brittleness of the materials employed or it may be affected by subsequent shoemaking operations, such as the treatment of the shoe in a leveling machine, but in any event it can readily be controlled by a proper choice of the composition of the hot-melt adhesive or, in the case of some unusual factor, by a previous treatment of the bottom surface of the last. Experience teaches, however, that such a treatment will seldom be necessary.

It will be readily understood that differences in the open-structured, fibrous materials through which the adhesive is injected and variations in the viscosity of the adhesive material to be injected will require slight differences in the size of the jet of molten material and in the pressure which is applied thereto. Concomitantly, materials of different viscosity may require different temperatures to bring the material to the best condition for injection. These factors, however, are only such as would be encountered in any use of thermoplastic adhesives and an examination of the resultant structure of the hardened adhesive, after it has been introduced, shows that it consists chiefly of a stem-like portion T which is integral with an enlarged head portion H spreading out at the interface. While it is possible to cause such a jet of material to penetrate even thin metals and to enter dense hard woods for a substantial fraction of an inch when applied directly thereto, there is always a spreading of the cement at the interface. This may be due to a difference in the densities of the two materials through one of which it is passing or it may result from the inherent lack of resistance to lateral spreading at the interface because of the fact that no substantial pressure is being applied to hold the two layers together. A close examination under the microscope shows that the jet as it progresses tends to seek out the path of least resistance and to form minute branches among the fibres of the material. That action seems to be of less importance when the density of the material through which the jet passes is low, with the consequence that the stem T of the injected material remains substantially uniform over short distances.

When, in the practice of the method, the work comprises a plurality of thin layers of material there will be variations in the resulting structure of the bond. One such is illustrated at Fig. 9 where an insole I upon a last L has been associated with a shoe upper U and various lining or doubling materials D which are overlasted on the bottom of the insole. The injection of material according to the method then results as the material freezes in a continuous stem T' of a plastic fastening member extending through the layers U and D and partially penetrating the insole I. At the same time lateral dispersion of materials at the interfaces will result in the formation of enlarged portions H', $H^2$ at the interfaces. By applying a series of such spots S along the margin of the shoe, the fastenings for a progressive lasting operation are provided. With two layers of relatively thin material supported directly by a heavy mass such as the last L, the jet can be controlled in size and pressure so as to disperse at the interface between the layers and to produce a strong bond at the interface, without passing through the lower layer. If the lower face of this layer is an exposed surface, the appearance thereof is not changed.

A common denominator of these applications of adhesive, in accordance with the method, lies in the fact that injections are made through the unbroken surface of the material in jets which have a diameter of a few thousandths of an inch such as .012 to .040 of an inch. As a consequence the appearance of the outer surface of the work is changed but little. In some cases the cement appears as small dots on the surface and in other cases it almost disappears among the fibres of the work.

Figure 1:
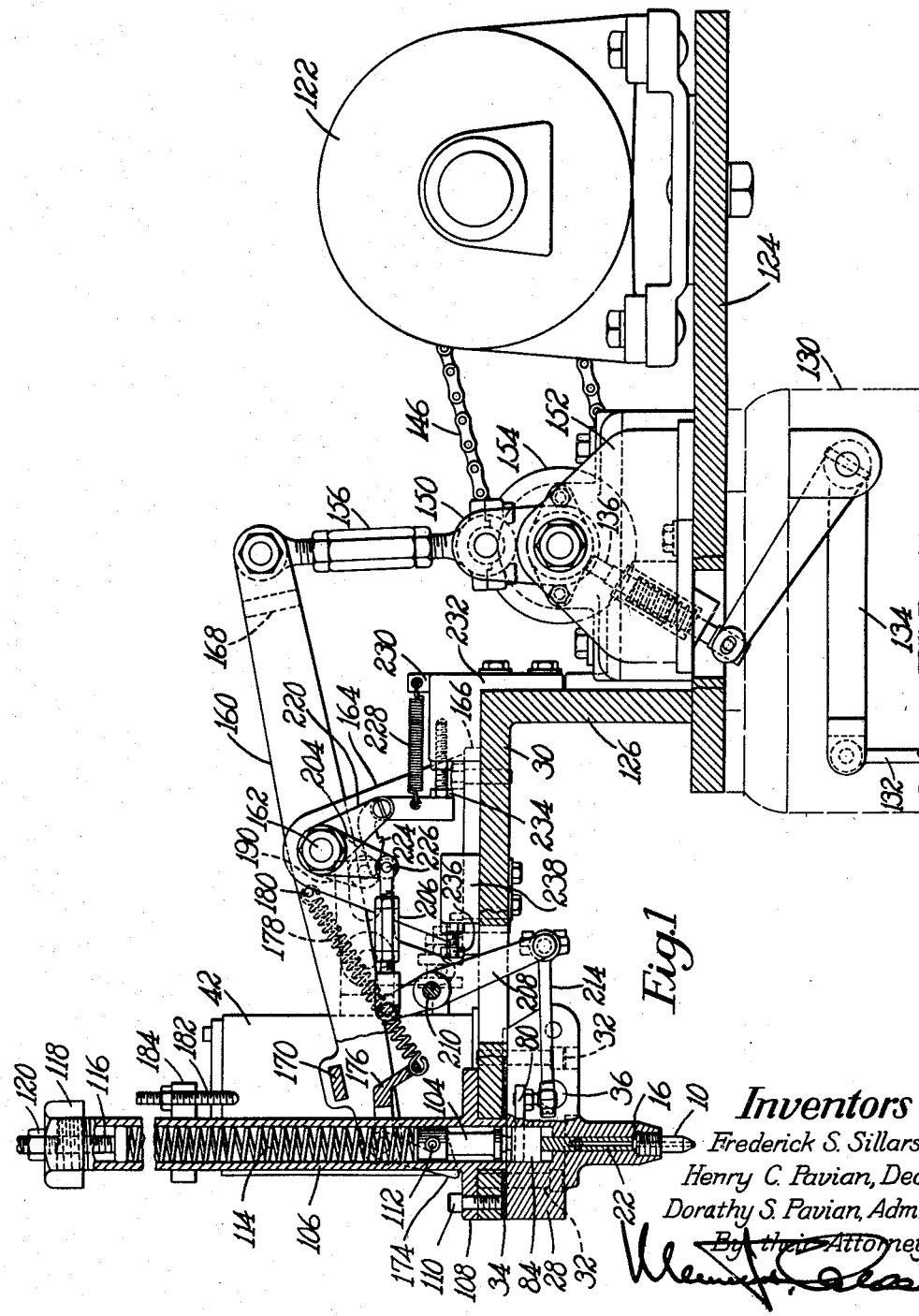

Various sorts of adhesive may be employed and it has been found advantageous to utilize some of the resinous thermoplastic materials which can be heated and delivered in a fluid condition through a heated nozzle 10 which, as may be seen from Fig. 7, has a small passageway 12 terminating in a much smaller outlet opening 14 having a diameter of a few thousandths of an inch. This adhesive has previously been delivered to a chamber 16 (Fig. 1), in a manner which will be explained below, having reached it through a piston passage 18 emerging at its upper end in a vertical recess 20 in the peripheral surface of a piston 22. The upper end of this piston is rectangular at 24 and, for reasons which will later appear, is provided with lateral lugs 26 (Fig. 10) each rounded on one side.

The piston 22 slides vertically in the upper part of the chamber 16 in a heated nozzle holder 28 which is attached to the under side of a frame 30 (Fig. 1) by screws 32 and the transfer of heat to the frame is reduced to a minimum by the interposition of a sheet of insulating material 34. This nozzle holder 28 is kept at the desired temperature by one or more heating units 36 and it has a horizontal passage 38 (Fig. 7) reduced in size at its inner end and positioned to deliver the adhesive to the chamber 16 through the peripheral recess 20 of the piston 22 when this is brought in register with the passage.

The delivery of adhesive to the passage 38 is through a connector 40 (Fig. 3) which is supported upon the bottom of a receptacle 42 (Fig. 6) by means of screws 44, after having passed through an opening 46 (Fig. 3) in the frame 30. The receptacle 42, attached to the frame 30 by means of screws 47, is separated from the frame by a sheet of insulation 48. The receptacle has an adhesive receiving chamber 50 and is maintained at the desired temperature by a series of heating units 52, 54 controlled by a thermostat 56. This chamber is provided with a displaceable cover 58. In the case of one particular adhesive the receptacle is maintained at a temperature of 275° while the nozzle 10 is heated to 350°. This avoids the overheating of the quantity of adhesive in the receptacle and at the same time maintains the nozzle at a temperature such that the desired degree of fluidity is reached to enable easy ejection thereof.

Interposed between the receptacle chamber 50 and the connector 40 is a pump comprising a horizontal passage 60 (Fig. 6) in which a pump plunger 62 reciprocates. This passage 60 is connected with the chamber 50 by an outlet opening 64 and opens into the connector 40 through a vertical passage 66 in the receptacle 42. A bypass between the pump passage 60 and the chamber 50 comprises a vertical passage 68 which is normally kept closed by a ball valve 70 held down by a spring 72 the tension of which may be adjusted by means of a screw 74. It also comprises a horizontal passage 76 leading into the chamber 50.

The turning of the nozzle piston 22, to bring the recess 20 therein into alinement with the passage 38 leading from the pump, is effected by a horizontal lever 80 having a square opening 82 which fits loosely around the square portion 24 of the nozzle piston. The end of the lever in which the opening 82 is made is also provided with a recessed portion 84 to provide room for a two-element cam projecting up from an enlarged end 86 of a handle 88 which may be secured in adjusted position by means of a clamp screw 90 extending down through a slot 92 in the nozzle holder 28. In this enlarged portion of the handle there is provided a vertical passage 94 permitting free vertical movement of the nozzle piston 22 and the handle has diametrically opposite cam surfaces 96, 98 (Figs. 8 and 10) up which the lugs 26 ride so that when the lateral recess 20 of the nozzle piston is brought into alinement with the passage 38 the lugs 26 will ride up on the cam surfaces and lift the piston 22 to provide the chamber 16 just above the nozzle 10. The volume of this chamber is determined by the adjustment of the handle 88 and is sized to contain only as much as is needed for a single ejection since an excess amount might interfere with the velocity of the jet because of a slight compressibility of the adhesive. The viscosity of the cement is such that there is substantially no flow of the adhesive in the passage 12 of the nozzle until it is pushed through it by a blow on the upper end of the piston 22. When this occurs, the piston 22 will be floating on the adhesive in the chamber 16 and will have been turned back so that the lugs 26 are displaced from the cam surfaces 96, 98 and above level portions 100 of the enlarged end 86.

A blow on the projection 102 (Fig. 7) at the top of the nozzle piston 22 to eject the cement through the opening 14 of the nozzle 10 at high velocity, will be administered with almost explosive force by means of a hammer 104 (Figs. 1 and 3) which is guided for vertical movement in a slotted tube 106 having a bottom flange 108 which, by means of screws 110, is secured to the upper surface of the frame 30. The hammer also has a transverse pin 112 extending through the slots of the tube 106 and by means of which it is lifted, thereby compressing a spring 114 which is contained within the tube 106. The degree of compression of the spring 114 is regulated by means of a hand screw 116 threaded in a cap 118 and held in adjusted position by a locknut 120.

Figure 2:
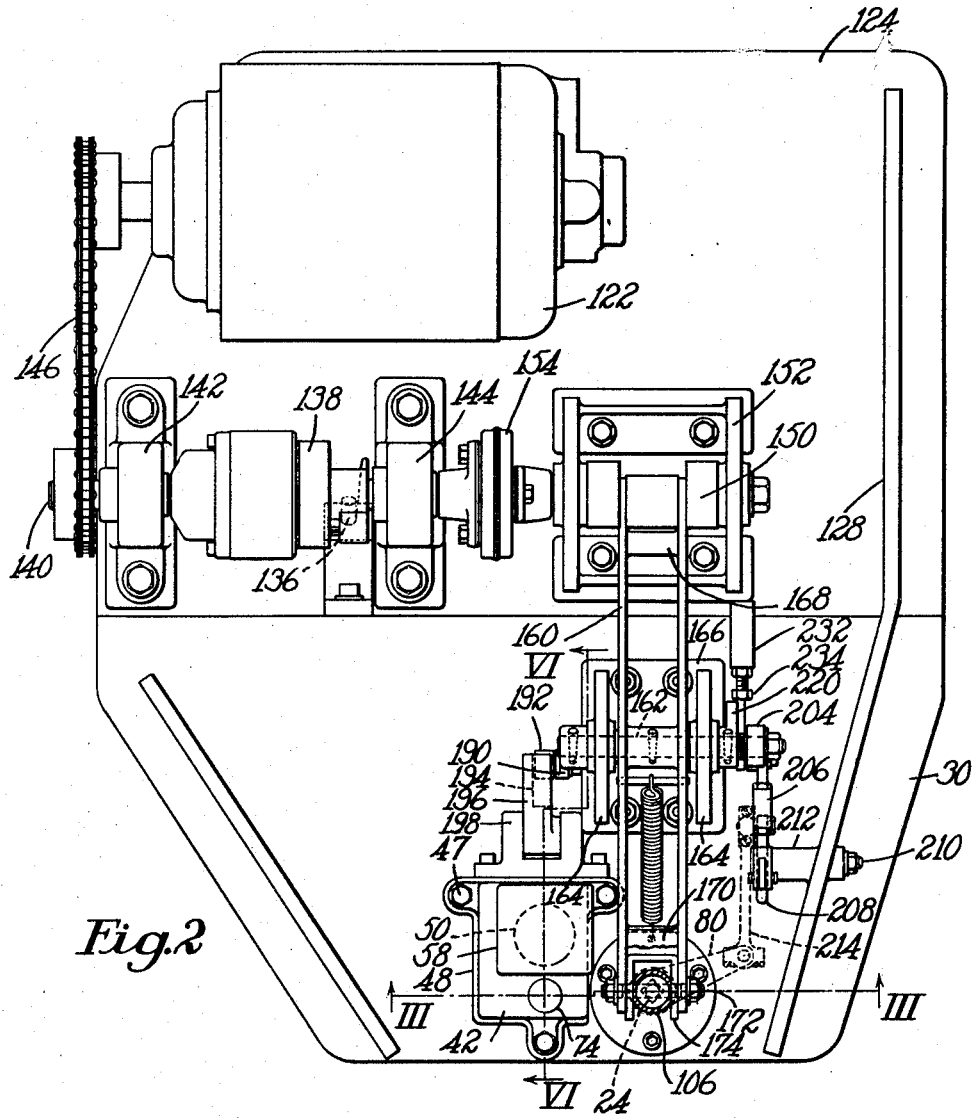
Fig. 2 is a plan view thereof.

A mechanism for operating the pump plunger 62, turning the piston 22 and lifting the hammer 104 is operated mechanically by the power of a motor 122. This is mounted on a shelf 124 which is joined to the frame 30 by means of a vertical flange 126 and a front-to-back fence-like flange 128 (Fig. 2). The frame as a whole is supported upon a suitable pedestal 130 at the bottom of which is a treadle (not shown) connected by a treadle rod 132 (Fig. 1) to a bell crank 134 operating an actuator 136 of a clutch 138 of any suitable construction. The clutch is mounted on a transverse horizontal shaft 140 (Fig. 2) carried in bearings 142, 144 and driven from the motor 122 by sprockets and a chain 146. Blocks for these bearings 142, 144 are mounted on the frame shelf 124 and substantially in alinement with them is a crank 150 carried in bearings 152 and joined to the driven portion of the clutch 138 by means of a flexible connector 154. The power of the crank 150 is utilized for lifting the hammer by connecting the crank through an adjustable connecting rod 156 (Fig. 1) to a walking beam 160 pinned to a shaft 162 which is supported in bearings formed in flanges 164 of a block 166 secured by screws to the frame 30.

The walking beam 160 comprises two side bars which are interconnected by cross pieces 168, 170. In the forward end of this walking beam are pivot pins 172 on which are hung catches in the form of pivoted hooks 174 (Fig. 1) interconnected by a cross flange 176 and having notches the bottom surfaces of which slope slightly up for a purpose to be described later. The hooks are pulled rearwardly by a spring 178 tensioned between the flange 176 and a pin 180 on the beam. If, then, the beam starts in an upper position and the forward end descends, the hooks will snap over the cross pin 112 which protrudes through the slots of the tube 106. Then, as the beam tilts so that the forward end rises, it will carry with it the hammer compressing the spring 114 until, at the upper end of its range of movement, the rear ends of the interconnected hooks 174 engage the lower ends of stop pins 182 (Figs. 1 and 3) adjustably mounted in a bracket 184 attached to the guide tube 106. At this time the hooks 174 are withdrawn from the cross pins 112 of the hammer against the tension of the spring 178 and the hammer is forced violently down until it hits the projection 102 at the top of the piston, thus ejecting the fluid in the chamber 16 through the nozzle.

A reciprocation of the pump plunger 62 (Fig. 6) is effected from the same cross shaft 162 by a crank arm 190 pinned to the shaft 162 at its left end (Fig. 2). This arm carries a roll 192 engaging a groove 194 in a bell crank 196 (Fig. 6) carried between lugs of a block 198 secured to the rear face of the receptacle 42. The lower forward end of the bell crank 196 is forked and provided with pins 200 received between the flanges of a grooved collar 202 secured to the pump plunger 62.

A mechanism for operating the arm 80 imparts a partial rotation to the nozzle piston 22 so that it will act as a valve and comprises an arm 204 (Figs. 1 and 3) which is loose on the end of the shaft 162 and is connected at its lower end by means of an adjustable rod 206 to an oscillatory lever 208 carried by a pin 210 mounted in a lug 212 (Fig. 2) which is integral with the forward portion of the fence-like flange 128. The lower end of this 208 is connected to the arm 80, which rotates the nozzle piston, by means of a connecting rod 214 which is joined to said arm 80 and to the lever 208 by ball joints. The range of the movement of the lever 208 as it turns the lever 80 to the rear is limited by a stop 236 threaded in a block 238 which is attached to the frame 30 beside the bearing 166.

Figure 3:
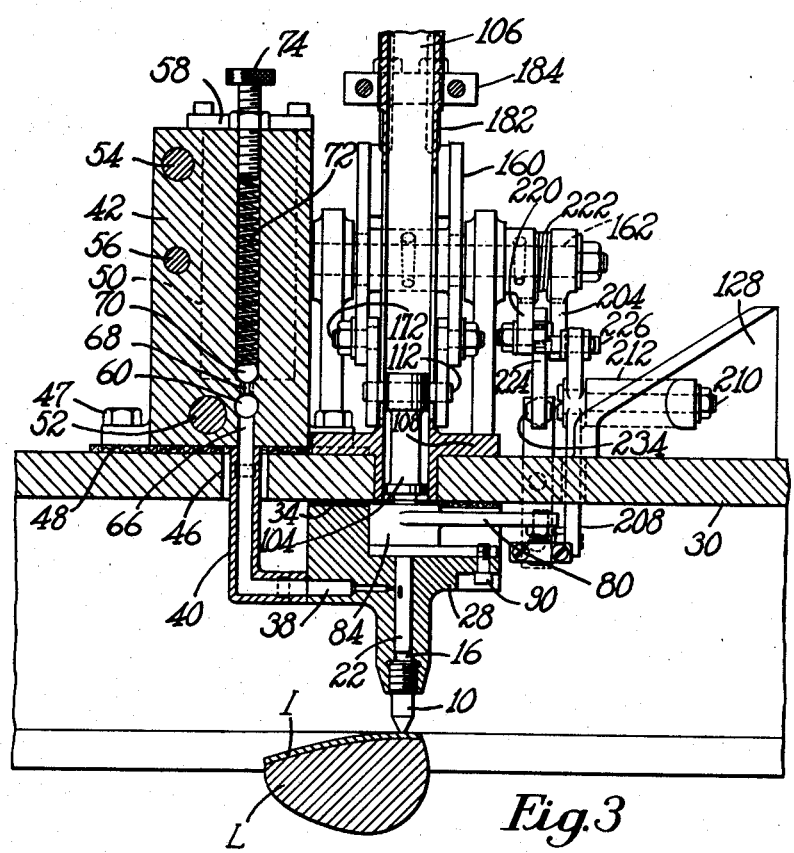
Fig. 3 is a transverse vertical section near the front of the machine on the line III—III of Fig. 2.

An intermittent movement is imparted to this arm 204 by means of an arm 220 pinned to the shaft 162 and connected to the arm 204 by a torque spring 222 (Fig. 3). The arrangement of this spring is such that it tends to turn the arm 204 (Fig. 1) clockwise and to move the rod 206 to the left. It should be noted that, in addition to this impositive connection, the lower end of the arm 220 has mounted upon it a latch 224 which is pivoted on said arm and is held against the extension of a pin 226, which joins the arm 204 and the rod 206, by a spring 228 connected to a tail on the latch and to a stud 230 on a bracket 232 attached to the frame 30. This bracket also has an adjustable stop screw 234 in line with the lower end of the latch 224. Consequently, when the arm 220 moves counterclockwise as viewed in Fig. 1, assuming that the latch 224 has previously engaged the pin 226, the arm 204 will be moved counterclockwise until the tail of the latch 224 engages the stop pin 234. Thereupon, the arm 204 will be released and the lever 208 rotated counterclockwise by the spring 222 to pull the lever 80 to the rear, as viewed in Figs. 1 and 2.

In carrying out the method with the assistance of this machine an operator will place two layers of material in superposed, contiguous relation and would normally hold them in that relation as he brings the upper surface of the upper layer to the nozzle 10. Close contact with the nozzle is not essential. If a heavy mass is used to support the layers, the positioning of the bond at a selected interface may be controlled. He then depresses the treadle attached to the treadle-rod 132 whereupon the sequence of operation of these mechanisms proceeds from a starting point determined by the actuator 136 of the clutch 138 at which the left end of the beam 160 is near the top of its travel, whereupon the forward end of the beam descends to pick up the hammer 104. At this time the pump plunger 62 is exerting pressure upon the adhesive contained in the connector 40 and the nozzle piston 22 is being rotated mechanically by the latch 224 which had previously been engaged with the pin 226. This rotation of the piston 22 over an arc of approximately 45° brings the peripheral recess 20 thereof into register with the passage 38 of the nozzle block just as the lugs 26 start to ride up the cams 96, 98. Consequently, at this time the nozzle piston 22 is being elevated to provide a space 16 and the adhesive under pressure in the connector 40 is pushed into the space 16.

At the bottom of the travel of the forward end of the beam 160, the tail of the latch 224, coming into contact with the stop 234, is nearly ready to be disengaged. The hooks 174 are pushed aside by the cross pin 112 of the hammer and then move lower until they receive said pin. As they do so, the slope of the hook surfaces engaged by the pin is such that the hammer is lifted slightly, thus taking it away from the nozzle piston to avoid any possibility of pre-extrusion by reason of the weight of said hammer on the piston. Then the latch 224 is released and the torque spring 222 turns the piston 22 to a position where the recess 20 is out of line with the passage 38 and the piston, having been elevated, is ready for the hammer blow. As the forward end of the beam 160 goes up, the hooks 174 are brought into engagement with the stops 182 and the hammer is released and is forced violently against the piston, extruding the adhesive.

As the beam 160 is coming down, the pump plunger 62 moves forward, putting under pressure the fluid in the connector 40 and the passage 38. When, however, the hammer is being raised the pump plunger 62 is moving back and since the opening of the nozzle piston 22 is out of line with the passage 38 the pump creates a slight vacuum which helps to suck the adhesive down from the chamber 50 through the opening 64. At the time when the plunger 62 is exerting pressure on the adhesive the by-pass valve 70 may be opened, depending upon the tension of the spring 72, and may allow some adhesive to pass back into the chamber. As a result, the pressure of the cement in the connector 40 is held at a desired value depending upon the adjustment of the screw 74 at the top of the receptacle.

The invention having thus been described, what is claimed as new and what it is desired to secure by Letters Patent of the United States is:

1. That improvement in the art of temporarily securing insoles to lasts to hold them against displacement during the lasting of shoes, which comprises the steps of maintaining an insole blank in contact with the bottom of a last and introducing at the interface between the insole and the last bottom a plurality of frangible fastening elements formed by projecting at selected points on the outer unpierced surface of the insole heated liquid plastic adhesive in the form of minute jets at pressure and velocity sufficient such that the adhesive pierces the insole and after passing therethrough is dispersed laterally at the interface between the insole and the last bottom, whereupon the hot adhesive instantaneously hardens on contact with the last to form plastic fastening elements.

2. In the art of progressively securing successive portions of the lasting margin of an upper to an insole supported on a last, the improvement which comprises inserting through each successive portion of the upper and into the insole a plastic fastening formed by directing minute jets of heated liquid thermoplastic adhesive against the solid outer surface of the upper at sufficient pressure and velocity to pierce said outer surface and penetrate through the thickness of the upper material and into the insole and spread laterally at the interface between the upper and the insole, whereupon the adhesive hardens in place upon contact with the insole to provide a fastening securing the upper in lasted position.

References Cited in the file of this patent

UNITED STATES PATENTS

| | | |
|---|---|---|
| 1,861,003 | Foster | May 31, 1932 |
| 2,029,922 | Heckel et al. | Feb. 4, 1936 |
| 2,447,512 | Leahy | Aug. 24, 1948 |
| 2,488,685 | Riddle | Nov. 22, 1949 |
| 2,557,668 | Lincoln | June 19, 1951 |
| 2,616,482 | Barnes | Nov. 4, 1952 |
| 2,704,543 | Scherer | Mar. 22, 1955 |